United States Patent Office 3,359,303
Patented Dec. 19, 1967

3,359,303
REACTION PRODUCTS OF POLY(ALKYLENOXY)
ALKYL 1 - AZIRIDINECARBOXYLATES WITH
POLYAMINES
William P. Coker and Robert E. Lane, Jr., Lake Jackson,
Tex., assignors to The Dow Chemical Company, Midland, Mich., a corporation of Delaware
No Drawing. Filed Jan. 31, 1964, Ser. No. 341,773
8 Claims. (Cl. 260—482)

This invention relates to new compositions of matter and to the preparation of such compositions. More particularly, the present invention relates to carbamates which contain a plurality of ether linkages, to the preparation of such carbamates and to the use of these carbamates in the production of cured materials based upon epoxy resin compositions.

The reaction of aniline with cyclohexyl 1-aziridinylformate to produce O-cyclohexyl-N-(β-anilinoethyl)urethane is disclosed by Iwakura et al. in J. Org. Chem., 25, 1118–1123 (1960). Other reactions of various amines with esters of 1-aziridinecarboxylic acid are disclosed in French Patent 1,279,318 and in Netherlands Patent 63,864.

It is also known that conventional amine curing agents (used to promote cross-linking in epoxy resins) are often toxic, hygroscopic or skin sensitizing materials which produce relatively brittle plastic materials upon completion of the cure cycle. Various methods have been tried in attempts to reduce the brittleness of such compositions. For example, curing agents which contain an S—S linkage or adducts formed by the reaction of amines and vegetable oil acids have been employed. Such substances may reduce the brittleness of the cured plastic, but often the resulting product is more sensitive to certain hydrocarbon solvents (such as toluene). Similarly, hardeners which are of reduced toxicity usually contain hydroxyl groups in the molecule, and the presence of these hydroxyl groups tends to increase solvent absorption properties of the resulting cured product.

It has now been found that a new class of carbamates, which contains ether linkages but no hydroxyl within the molecule, can be prepared by the reaction of a polyamine and a polyether which contains a 1-aziridinylformate group. The novel carbamates which are produced by this reaction are excellent curing agents for epoxy resins and produce cured plastics with superior physical and chemical properties when compared with compositions formed with conventional curing agents (such as the standard diethylenetriamine-epoxy resin system). Cured epoxy resin compositions prepared with the compounds of the invention are generally more flexible than the corresponding plastics obtained with conventional amine curing agents. In addition, the properties of the cured epoxy resins can be controlled by variation of both the number and kind of alkoxy groups and/or alkylenoxy groups in the molecule.

The novel curing agents of the invention may be prepared according to the following reaction (I)

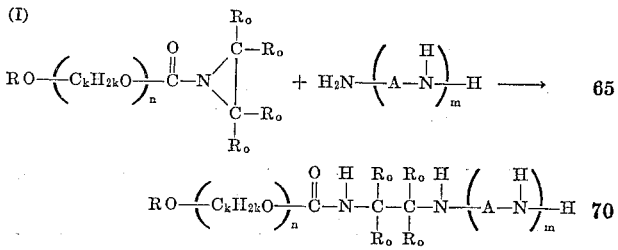

wherein R is an alkyl group of from 1 to 18 carbon atoms or a group of the formula

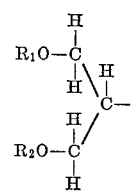

(each of $R_1$ and $R_2$ is a lower alkyl group of from 1 to 4 carbon atoms), $k$ is an integer of from 2 to 4 and may have a different value of each $n$ (for example, in the group, —$CH_2CH_2OCH_2CH_2CH_2O$—, $n$ is 2 and $k$ is 2–3), $n$ is an integer of from 2 to 20, each $R_o$ is a hydrogen atom or a lower alkyl group of from 1 to 4 carbon atoms (i.e., the group $+C_pH_{2p})H$ where $p$ is an integer of from 1 to 4) such as a methyl, ethyl, n-propyl, i-propyl, n-butyl, sec.-butyl, iso-butyl or tert.-butyl group, A is a divalent alkylene group of from 2 to 4 carbon atoms (e.g., ethylene, propylene, trimethylene, tetramethylene, isobutylene, etc.) and $m$ is an integer of from 1 to 6. Examples of suitable R groups include lower alkyl groups as previously defined and a hexyl, heptyl, octyl, nonyl, decyl, undecyl, dodecyl, tridecyl, tetradecyl, pentadecyl, hexadecyl, heptadecyl or octadecyl group.

Typical polyamine compounds which may be reacted with the alkylenoxy 1-aziridinecarboxylates according to Equation I include ethylenediamine, diethylenetriamine, tetraethylenepentamine, triethylenetetramine, 1,3-propanediamine, 1,4,8-triazaoctane and 1,2-propanediamine.

The carbamate curing materials of the invention are prepared by mixing a poly(alkylenoxy)alkyl ester of 1-aziridinecarboxylic acid as defined in Equation I and a polyamine in a mole ratio of about 1:1. Mole ratios of from about 1.5:1 to .5:1 (poly(alkylenoxy)alkyl ester of 1-aziridinecarboxylic acid:polyamine) may be used, but it is preferable to employ amounts of reactants sufficient to provide as close to a stoichiometric ratio as possible in the reaction zone. The reaction may be carried out at temperatures of from about 0° to 150° C. for time periods of from about 0.1 to 10 hours. It is preferable to carry out the reaction at temperatures of from 40° to 60° C. for a period of time sufficient to form the desired carbamates (usually from 1 to 3 hours). The reaction may be carried out at any pressure of from 0.1 to 100 p.s.i. The reaction is generally carried out at atmospheric pressure using an inert solvent and/or an inert atmosphere (such as nitrogen). As used herein, the term "poly(alkylenoxy)alkyl ester of 1-aziridinecarboxylic acid" is meant to represent the esters defined in Equation I and includes those esters in which the aziridine ring is substituted or unsubstituted.

The starting polyalkylenoxy esters of 1-aziridinecarboxylic acid are prepared by the reaction of a polyalkylenoxy alcohol and phosgene to form the corresponding chloroformate. Reaction of the chloroformate with an aziridine compound of the formula

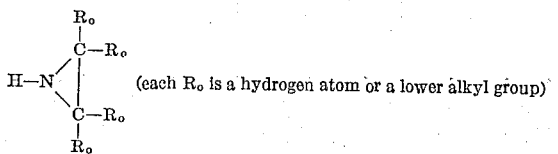 (each $R_o$ is a hydrogen atom or a lower alkyl group)

yields the ester of 1-aziridinecarboxylic acid used as a starting material in the present invention. The polyalkylenoxy alcohols are prepared by conventional methods (i.e., oxyalkylation of hydroxyl-containing compounds) such as are disclosed in United States Patents 2,841,479 and 2,782,240 (both by Hefner et al.).

The following reactions further illustrate the invention:

(1)
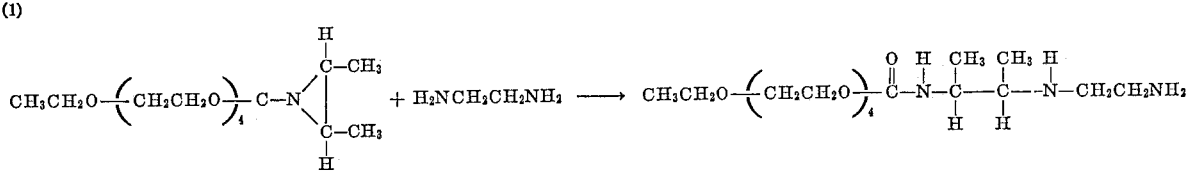

(2)
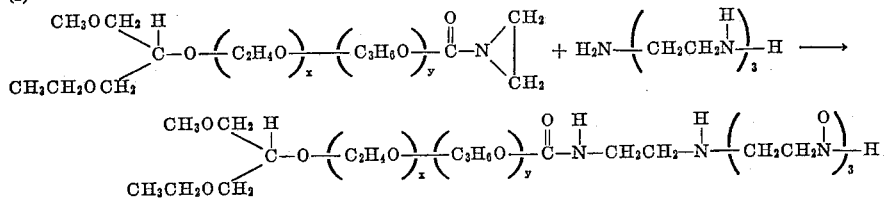

(3)
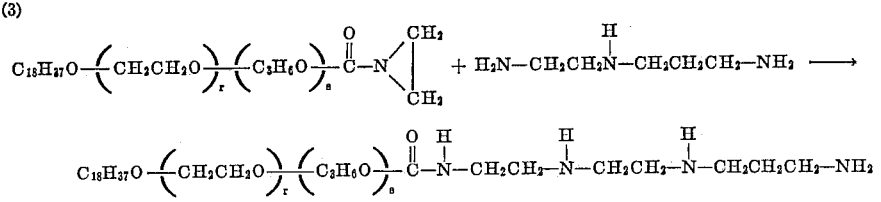

($r$ and $s$ are integers such that the sum of $r+s$ is from about 2 to 20)

In the above equations, it is to be understood that the different alkylenoxy groups may be in any order in the chain, e.g., $\{C_2H_4O\}_2\{C_3H_6O\}_2$ includes groups such as

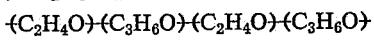

and $\{C_3H_6O\}\{C_2H_4O\}_2\{C_3H_6O\}$, etc.

The cured epoxy resin compositions are prepared by mixing the carbamates of the invention with the epoxy resin in amounts sufficient to obtain cross-linking of the resin. Any resin with curable epoxy groups may be used. Epoxy resins which are formed by the reaction of an epihalohydrin and Bisphenol-A (polyglycidyl polyethers of Bisphenol-A) are preferred. An amount of carbamate compound sufficient to provide one active hydrogen atom (bonded to aminonitrogen) per epoxy group of the resin is usually employed. The hydrogen atom on the carbamate nitrogen is not an active hydrogen atom. The stoichiometric amount of carbamate per hundred parts (weight) of resin is obtained by dividing the amino hydrogen equivalent weight by the epoxide equivalent weight of the resin and multiplying this ratio by 100. The epoxy resin may be cured at ambient room temperatures over a period of several days or may be cured in less than an hour with temperatures of about 90°–110° C. Suitable polyglycidyl polyethers of Bisphenol-A [2,2-bis(4-hydroxyphenyl)propane] may be represented by the formula

[2,2-bis(4-(2′,3′-epoxypropoxy)phenyl)propane]. Other cross-linking agents, modifiers and reactive diluents may be used in addition to the curing agents of the present invention.

The following examples are submitted for the purpose of illustration only and are not to be construed as limiting the scope of the invention in any way.

*Example 1*

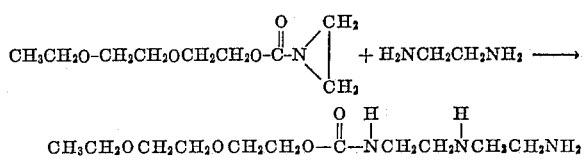

A 91–92 percent pure (based on aziridinyl content) liquid 2-(2-ethoxyethoxy)ethyl ester of 1-aziridinecarboxylic acid (prepared by reacting diethylene glycol monoethyl ether with phosgene to form the corresponding chloroformate, followed by the reaction of this chloroformate with ethylenimine) was added slowly dropwise (249 grams; 1.15 mole) to ethylenediamine (66.8 grams; 1.11 mole) at 40°–50° C. under dry nitrogen in the same reactor used for the preparation of the chloroformate and aziridinecarboxylate. The reaction mixture was stirred for one hour at 60°–65° C., then cooled. The product, 306.4 grams of a water clear liquid ($d_4^{25}$=1.1188), had a refractive index (20° C., Na D line) of 1.4750 and a viscosity of 120 centipoises at 25° C.

Reaction of 118 grams of this product with 188 grams of "DER–331" epoxy resin, a liquid epoxy resin having an epoxy equivalent weight of 188, manufactured by The Dow Chemical Company, at 80° C. overnight gave a plastic having a tensile strength of 1143 p.s.i., 64.7 percent elongation, 4.97 ft. lb./in. impact strength and a Shore

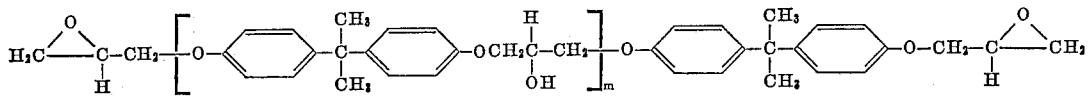

wherein $m$ is a number of from 0 to 20, depending upon the desired viscosity or melting point of the resin. When $m$ is zero, the diglycidyl ether of Bisphenol-A is obtained D hardness of 31. It absorbed only 3 percent of its initial weight of toluene in 24 hours.

*Example II*

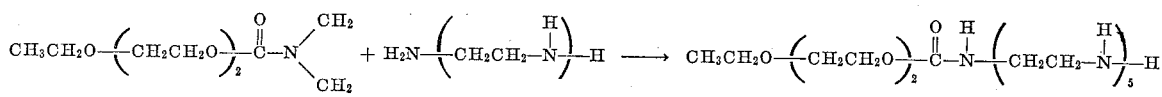

In a procedure and with an apparatus similar to that of Example I, 215.4 grams (0.97 mole) of the 2-(2-ethoxyethoxy)ethyl ester of 1-aziridinecarboxylic acid was reacted with 184 grams (0.97 mole) of tetra-ethylenepentamine. The resulting product (393 grams of a clear yellow liquid, $d_4^{25}=1.1102$) had a refractive index (20° C. Na D line) of 1.4954 and a viscosity of 410 centipoises at 25° C.

Reaction of 86 grams of this product with 188 grams of "DER-331" epoxy resin gave a plastic having a tensile strength of 10,900 p.s.i., 9.6 percent elongation, 1.08 ft. lb./in. impact strength, Shore D hardness of 84.5 and no absorption of toluene in 24 hours.

*Example III*

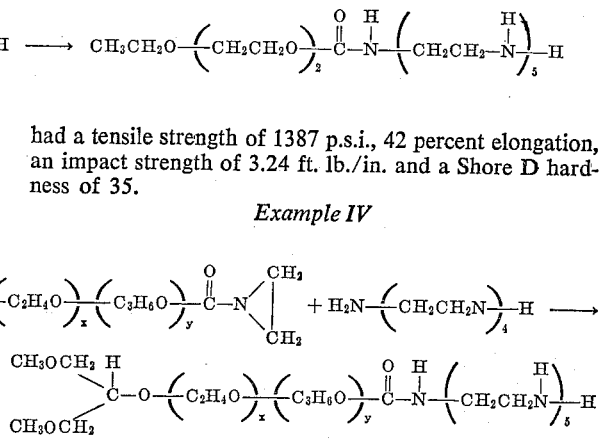

($x$ and $y$ are from 2 to 5 and indicate the number of alkylenoxy groups, but not the relative order, in the molecule).

The starting polyalkylenoxy ester of 1-aziridinecarboxylic acid was prepared by first reacting a mixture of equimolar amounts of ethylene oxide and propylene oxide with 1,3-dimethoxy-2-propanol as a polymerization initiator. The resulting product (a polyalkylenoxy alcohol with a 1,3-dimethoxy-2-propoxy end group) was a clear oil and had a molecular weight of 473 (trademark "Ambiflo H-19.1," available from the Dow Chemical Company). This product (526 grams) was reacted with 54 grams of ethylenimine in the presence of 124 grams of triethylamine and 1800 milliliters of benzene solvent. After removal of the volatile components of the reaction mixture, 457.5 grams of a yellow oil remained (the corresponding polyalkylenoxy alcohol ester of 1-aziridinecarboxylic acid). The oily product ($d_4^{25}=1.101$) contained 97.6 percent of the theoretical amount of the aziridinyl group and had a refractive index (20° C., Na D line) of 1.4578. A sample of this material (220.4 grams; 0.381 mole) was added dropwise to diethylenetriamine (39.2 grams; 0.381 mole) using a procedure and equipment similar to that employed in the preceding examples. The reaction temperature was 45° to 65° C. The carbamate product (240.6 grams of a very light yellow, somewhat cloudy, liquid; $d_4^{25}=1.068$) had a refractive index of 1.4724 (20° C. Na D line) and a viscosity at 25° C. of 540 centipoises. The actual amino hydrogen equivalent weight was 161 grams (theoretical equivalent weight≈161 grams).

The carbamate product was reacted with "DER-331" epoxy resin in a weight ratio of 161 grams of carbamate per 188 grams of epoxy resin. The resulting cured resin had a tensile strength of 1387 p.s.i., 42 percent elongation, an impact strength of 3.24 ft. lb./in. and a Shore D hardness of 35.

*Example IV*

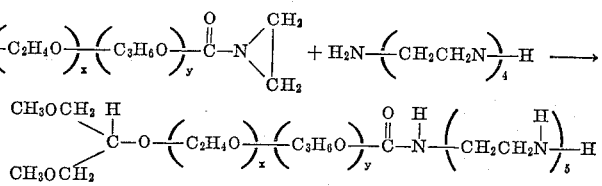

($x$ and $y$ are from 2 to 5; ethylene oxide groups may alternate with propylene oxide groups).

In a similar manner, 206 grams (0.357 mole) of the polyalkylenoxy ester of 1-aziridinecarboxylic acid (prepared in Example III) was reacted with 67.6 grams (0.357 mole) of tetraethylenepentamine at a temperature of from 45° to 65° C. The resulting carbamate product (256.5 grams of yellow liquid) had a refractive index (Na D line, 20° C.) of 1.4801 and a viscosity at 25° C. of 680 centipoises. Reaction of 139 grams of this product with 188 grams of "DER-331" epoxy resin gave a cured plastic with a tensile strength of 3920 p.s.i., 15.6 percent elongation, an impact strentgh of 1.5 ft. lb./in. and a Shore D hardness of 71.

We claim as our invention:
1. A compound of the formula

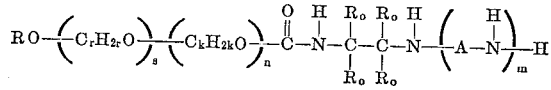

wherein:
(a) R is selected from the group consisting of an alkyl group of from 1 to 18 carbon atoms and a group of the formula

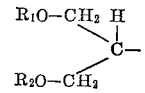

in which each of $R_1$ and $R_2$ is a lower alkyl group of from 1 to 4 carbon atoms,
(b) each of $r$ and $k$ is an integer of from 2 to 4,
(c) each of $n$ and $s$ is an integer of from 1 to 20, such that their sum is 2 to 20,
(d) each $R_o$ is selected from the group consisting of the hydrogen atom and a lower alkyl group,
(e) A is a divalent alkylene group of from 2 to 4 carbon atoms, and
(f) $m$ is an integer of from 1 to 6.

2. A compound of the formula

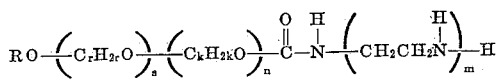

wherein:
(a) R is selected from the group consisting of an alkyl group of from 1 to 18 carbon atoms and a group of the formula

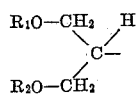

in which each of $R_1$ and $R_2$ is a lower alkyl group of from 1 to 4 carbon atoms,
(b) each of $r$ and $k$ is an integer of from 2 to 3,
(c) each of $n$ and $s$ is an integer of from 1 to 20 such that the sum $n+s$ is from 2 to 20, and
(d) $m$ is an integer of from 1 to 6.

3. A compound of the formula

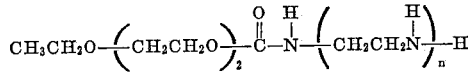

wherein $n$ is an integer of from 2 to 6.

4. A compound of the formula

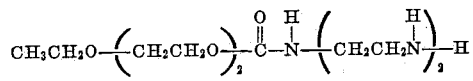

5. A compound of the formula

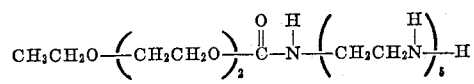

6. A compound of the formula

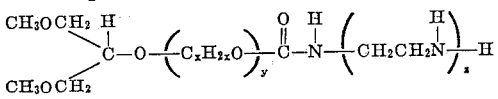

wherein $x$ is an integer of from 2 to 3, $y$ is from 2 to 5 and $z$ is an integer of from 2 to 6.

7. A compound of the formula

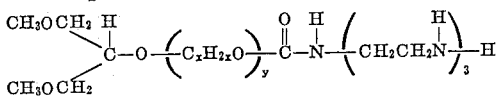

wherein $x$ is an integer from 2 to 3 and $y$ is from 2 to 5.

8. A compound of the formula

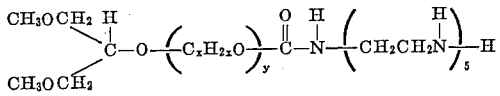

wherein $x$ is an integer from 2 to 3 and $y$ is from 2 to 5.

References Cited

UNITED STATES PATENTS 3,162,618  12/1964  Smith _____ 260—77.5
3,223,681  12/1965  Rambosek _____ 260—77.5

FOREIGN PATENTS 63,864  3/1949  Netherlands.
67,192  7/1942  Norway.

OTHER REFERENCES

Iwakura et al.: J. Organic Chem., vol. 25, pp. 1118–1123 (1960).

LORRAINE A. WEINBERGER, *Primary Examiner.*
A. P. HALLUIN, *Assistant Examiner.*